(12) United States Patent
Connor

(10) Patent No.: US 11,157,208 B2
(45) Date of Patent: Oct. 26, 2021

(54) METHODS AND APPARATUS FOR IMPROVING DATA TRANSFORMATION IN PROCESSING DEVICES

(71) Applicant: Movidius LTD.

(72) Inventor: Fergal Connor, Dundalk (IE)

(73) Assignee: Movidius Limited, Schiphol-Rijk (NL)

( * ) Notice: Subject to any disclaimer, the term of this patent is extended or adjusted under 35 U.S.C. 154(b) by 0 days.

(21) Appl. No.: 16/615,088

(22) PCT Filed: May 18, 2018

(86) PCT No.: PCT/EP2018/063233
§ 371 (c)(1),
(2) Date: Nov. 19, 2019

(87) PCT Pub. No.: WO2018/211131
PCT Pub. Date: Nov. 22, 2018

(65) Prior Publication Data
US 2020/0174703 A1    Jun. 4, 2020

Related U.S. Application Data

(60) Provisional application No. 62/510,251, filed on May 23, 2017, provisional application No. 62/508,841, filed on May 19, 2017.

(51) Int. Cl.
*G06F 13/00* (2006.01)
*G06F 3/06* (2006.01)

(52) U.S. Cl.
CPC ............ *G06F 3/0659* (2013.01); *G06F 3/064* (2013.01); *G06F 3/0613* (2013.01); *G06F 3/0656* (2013.01); *G06F 3/0673* (2013.01)

(58) Field of Classification Search
CPC ...... G06F 3/0659; G06F 3/0613; G06F 3/064; G06F 3/0656; G06F 3/0673; G06F 17/147; G06T 1/60
See application file for complete search history.

(56) References Cited

U.S. PATENT DOCUMENTS

| | | |
|---|---|---|
| 5,805,483 A | 9/1998 | Shim |
| 10,474,390 B1 * | 11/2019 | Whyte ................. G06F 3/0638 |
| 2002/0036937 A1 | 3/2002 | Michinaka |

(Continued)

FOREIGN PATENT DOCUMENTS

| | | |
|---|---|---|
| EP | 1401106 | 3/2004 |
| JP | 3222633 | 10/2001 |

(Continued)

OTHER PUBLICATIONS

International Searching Authority, "Search Report and Written Opinion," issued in connection with application No. PCT/EP2018/063233, dated Sep. 13, 2018, 15 pages.

(Continued)

*Primary Examiner* — Jing-Yih Shyu
(74) *Attorney, Agent, or Firm* — Hanley, Flight & Zimmerman, LLC

(57) ABSTRACT

An example apparatus includes a memory, a data writer to write received first data into the memory in a first order, and a data reader to read the first data from the memory in a second order, wherein the data writer is to write second data into the memory in the second order.

40 Claims, 9 Drawing Sheets

(56) References Cited

U.S. PATENT DOCUMENTS

| | | | |
|---|---|---|---|
| 2004/0223550 A1 | 11/2004 | Hagiwara | |
| 2009/0060325 A1 | 3/2009 | Shiraishi | |
| 2015/0288977 A1 | 10/2015 | Chan et al. | |
| 2016/0110112 A1* | 4/2016 | Yeh | G06F 3/0659 |
| | | | 711/103 |
| 2016/0127598 A1* | 5/2016 | Yaguchi | H04N 1/2112 |
| | | | 348/231.99 |
| 2016/0335734 A1* | 11/2016 | Lee | G06T 1/20 |

FOREIGN PATENT DOCUMENTS

| | | |
|---|---|---|
| JP | 2009060317 | 3/2009 |
| WO | 2014205227 | 12/2014 |

OTHER PUBLICATIONS

International Bureau, "International Preliminary Report on Patentability," issued in connection with application No. PCT/EP2018/063233, dated Nov. 28, 2019, 10 pages.

* cited by examiner

FIG. 5

```
number blocks = L/M
increment = M
do
   offset = 0
   for i = 0 to (number blocks * N)-1
      for j = 0 to M-1
         address = offset + j
      end j offset = (offset+increment)%[(number blocks*N*M)–M]
   end i increment = (increment*number blocks)%[(number blocks*N*M)–M]
while data
```

FIG. 6

```
number blocks = L/M
increment = M*number blocks
do
   offset = 0
   for i = 0 to (number blocks * N)-1
      for j = 0 to M-1
         address = offset + j
      end j offset = (offset+increment)%[(number blocks*N*M)-M]
   end i increment = (increment*number blocks)%[(number blocks*N*M)-M]
while data
```

FIG. 7

```
number blocks = L/M
increment = M for write instance or M*N for read instance
do
   offset = 0
   for i = 0 to (number blocks * N)-1
      for j = 0 to M-1
         address = offset + j
      end j offset = (offset+increment)%[(number blocks*N*M)-M]
   end i increment = (increment*N)%[(number blocks*N*M)-M]
while data
```

FIG. 8

METHODS AND APPARATUS FOR IMPROVING DATA TRANSFORMATION IN PROCESSING DEVICES

RELATED APPLICATION

This patent claims the benefit of U.S. Provisional Patent Application Ser. No. 62/508,841, filed May 19, 2017, entitled "METHODS AND APPARATUS FOR BUFFER-LESS DATA TRANSFORMATION" and U.S. Provisional Patent Application Ser. No. 62/510,251, filed May 23, 2017, entitled "METHODS AND APPARATUS FOR BUFFER-LESS DATA TRANSFORMATION." U.S. Provisional Patent Application Ser. No. 62/508,841 and U.S. Provisional Patent Application Ser. No. 62/510,251 are hereby incorporated herein by reference in their entirety.

FIELD OF THE DISCLOSURE

This disclosure relates generally to processing devices, and, more particularly, to methods and apparatus for improving data transformation in processing devices.

BACKGROUND

In some electronic systems, data may be sourced in one format but processed in another. For example, a camera may output image data in a raster/line order but the data may be accessed in another order. For example, a processor processing image data using a discrete cosine transform (DCT) may access the image data in block order.

BRIEF DESCRIPTION OF THE DRAWINGS

FIG. 5 illustrates the example state 500 in which data has been written into the memory as the data is read in accordance with read order 402 of FIG. 4.

FIG. 6 illustrates instructions for calculating a write address.

FIG. 7 illustrates instructions for calculating a read address.

Wherever possible, the same reference numbers will be used throughout the drawing(s) and accompanying written description to refer to the same or like parts.

DETAILED DESCRIPTION

In some systems for transforming data (e.g., transforming data from raster/line order storage to block order) a buffer or other memory is utilized as an intermediate storage during the transfer. For example, the data may be read from a source in line order and written to the buffer in that same order. The data may then be read from the buffer in block order. During such an operation, the system waits for the data to be consumed (or nearly completely consumed) before the next batch of data can be fetched to avoid overwriting memory that may be waiting to be read. While double buffering (one buffer for the source data and one buffer for the application/processing side) can alleviate issues with waiting for data consumption, such an approach now utilizes two buffers (e.g., more computing resources). Utilizing multiple buffers is particularly discouraged in embedded computing systems in which the cost and physical space needed for implementing a buffer is undesirable.

Methods and apparatus disclosed herein facilitate data transformation that continues to fill memory (e.g., a single buffer) during the data read process before all of the memory has been read. In some examples, a single memory/buffer having a size equal to the product of the number of rows of the block size and the memory line length may be utilized in the data transformation process. As disclosed herein, initially, data is read into memory in the order that it is provided by the source. Once the memory is filled, the data may be read for processing. As the data is read from memory in the preferred order (e.g., in block order), additional data is written to memory in the order that the memory is read. Accordingly, the data may be accessed in the preferred order and the data may be refilled into the memory without the need to wait for the entire memory to be read and/or processed.

Figure 1:
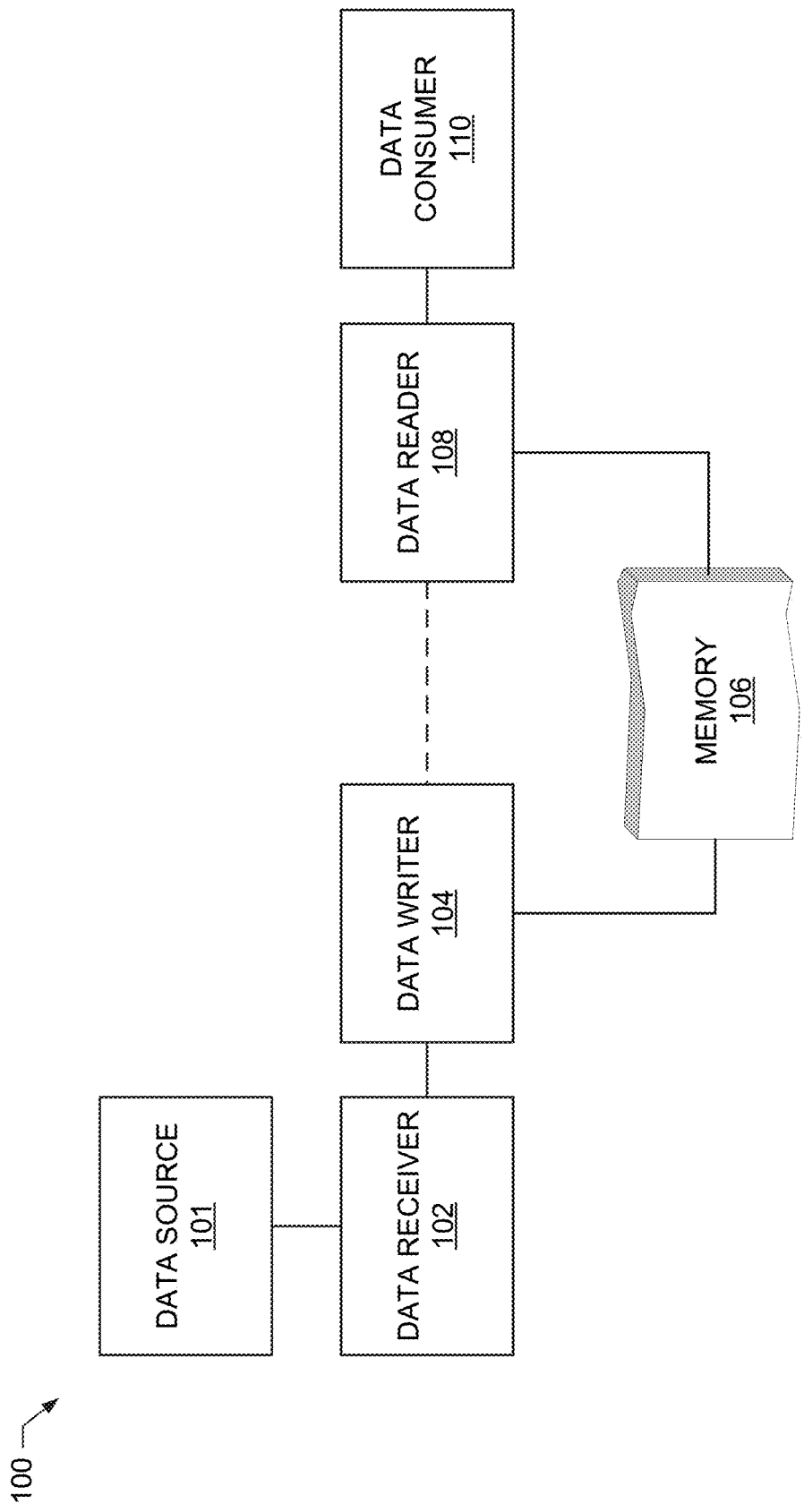
FIG. 1 is a block diagram of an example device implemented in accordance with the disclosure.

FIG. 1 is a block diagram of an example device 100 implemented in accordance with the disclosure. The example device 100 includes an example data source 101, an example data receiver 102, an example data writer 104, an example memory 106, an example data reader 108, and an example data consumer 110.

The device 100 may be any type of electronic device that handles data. For example, the device 100 may be a computing device, a processing device, etc. According to the illustrated example, the device 100 is an embedded computing device.

According to the illustrated example data from the example data source 101 is received by the data receiver 102, transferred to the data writer 104, and written to the example memory 106 by the data writer 104. During an initial stage, the data writer 104 writes the data to the memory 106 in the order in which the data is provided by the example data source 101. For example, when the data source 101 is implemented by a camera that outputs image data that is received by the data receiver 102, the example data writer 104 writes the image data to the memory in the linear order from the camera (e.g., writes the first element (e.g., block) of data to the first address of the memory 106, writes a second element to the second address of the memory, etc.).

According to the illustrated example, data is written to the memory 106 until the memory 106 is filled. Once the memory is filled, the data can start to be read from the memory 106 by the data reader 108. Once the reading begins, a next iteration of writing data to the memory 106 can begin. In the second and subsequent iterations, elements of data are written to the memory locations from which the prior data has been read. For example, after a first element at a first memory address has been read, the example data writer 104 can write a new element to the first memory address. According to the illustrated example, the new data is written in the same order that the memory is read. Alternatively, data may be written to locations in the memory 106 in any order as long as the data is written to memory locations from which the data reader 108 has already read the data. For example, an example write address increment process is discussed in conjunction with FIGS. 4 and 5.

The example memory 106 may be any type of memory and/or multiple memories. The example memory 106 is 128 bits of random access memory (RAM) (e.g., 8×FP16 memory). Alternatively, the memory 106 may be any type volatile and/or non-volatile memory.

The example data reader 108 reads the data from the memory 106 in an order compatible with the example data consumer 110. For example, the data that was written to the memory 106 in linear style may be read from the memory in a block order to be utilized by the example data consumer 110.

The example data consumer 110 may be any operation, mechanism, process, device, etc. that utilizes and/or operates on the data from the memory 106. For example, the data consumer 110 may calculate a DCT of the data. According to such an example, the data may be written to the memory 106 in the order in which the data is received from the example data source 101, but the example data reader 108 reads the data in the block order utilized in calculating the DCT.

The device 100 may be an Internet of Things (IoT) device. The internet of things (IoT) is a concept in which a large number of computing devices are interconnected to each other and to the Internet to provide functionality and data acquisition at very low levels. Thus, as used herein, an IoT device may include a semiautonomous device performing a function, such as sensing or control, among others, in communication with other IoT devices and a wider network, such as the Internet. IoT devices are physical objects that may communicate on a network, and may include sensors, actuators, and other input/output components, such as to collect data or perform actions from a real world environment. For example, IoT devices may include low-powered devices that are embedded or attached to everyday things, such as buildings, vehicles, packages, etc., to provide an additional level of artificial sensory perception of those things. Recently, IoT devices have become more popular and thus applications using these devices have proliferated.

Various standards have been proposed to more effectively interconnect and operate IoT devices and IoT network use cases. These include the specialization of communication standards distributed by groups such as Institute of Electrical and Electronics Engineers (IEEE), and the specialization of application interaction architecture and configuration standards distributed by groups such as the Open Connectivity Foundation (OCF).

Often, IoT devices are limited in memory, size, or functionality, allowing larger numbers to be deployed for a similar cost to smaller numbers of larger devices. However, an IoT device may be a smart phone, laptop, tablet, or PC, or other larger device. Further, an IoT device may be a virtual device, such as an application on a smart phone or other computing device. IoT devices may include IoT gateways, used to couple IoT devices to other IoT devices and to cloud applications, for data storage, process control, and the like. Such devices may benefit from increased efficiency and reduced buffer usage provided in accordance with the disclosure.

Networks of IoT devices may include commercial and home automation devices, such as water distribution systems, electric power distribution systems, pipeline control systems, plant control systems, light switches, thermostats, locks, cameras, alarms, motion sensors, and the like. The IoT devices may be accessible through remote computers, servers, and other systems, for example, to control systems or access data.

The example device 100 may be incorporated in a network. The network may include any number of wired and/or wireless devices. For example, the device 100 may be connected to and implemented within a cloud network, a fog network, a mesh network, a wide area network, a local area network, etc.

While an example manner of implementing the device 100 is illustrated in FIG. 1, one or more of the elements, processes and/or devices illustrated in FIG. 1 may be combined, divided, re-arranged, omitted, eliminated and/or implemented in any other way. Further, the example data source 101, the example data receiver 102, the example data writer 104, the example data reader 108, the example data consumer 110 and/or, more generally, the example device 100 may be implemented by hardware, software, firmware and/or any combination of hardware, software and/or firmware. Thus, for example, any of the example data source 101, the example data receiver 102, the example data writer 104, the example data reader 108, the example data consumer 110 and/or, more generally, the example device 100 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example, example data source 101, the example data receiver 102, the example data writer 104, the example data reader 108, and/or the example data consumer 110 is/are hereby expressly defined to include a non-transitory computer readable storage device or storage disk such as a memory, a digital versatile disk (DVD), a compact disk (CD), a Blu-ray disk, etc. including the software and/or firmware. Further still, the example device 100 may include one or more elements, processes and/or devices in addition to, or instead of, those illustrated in FIG. 1, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 2:
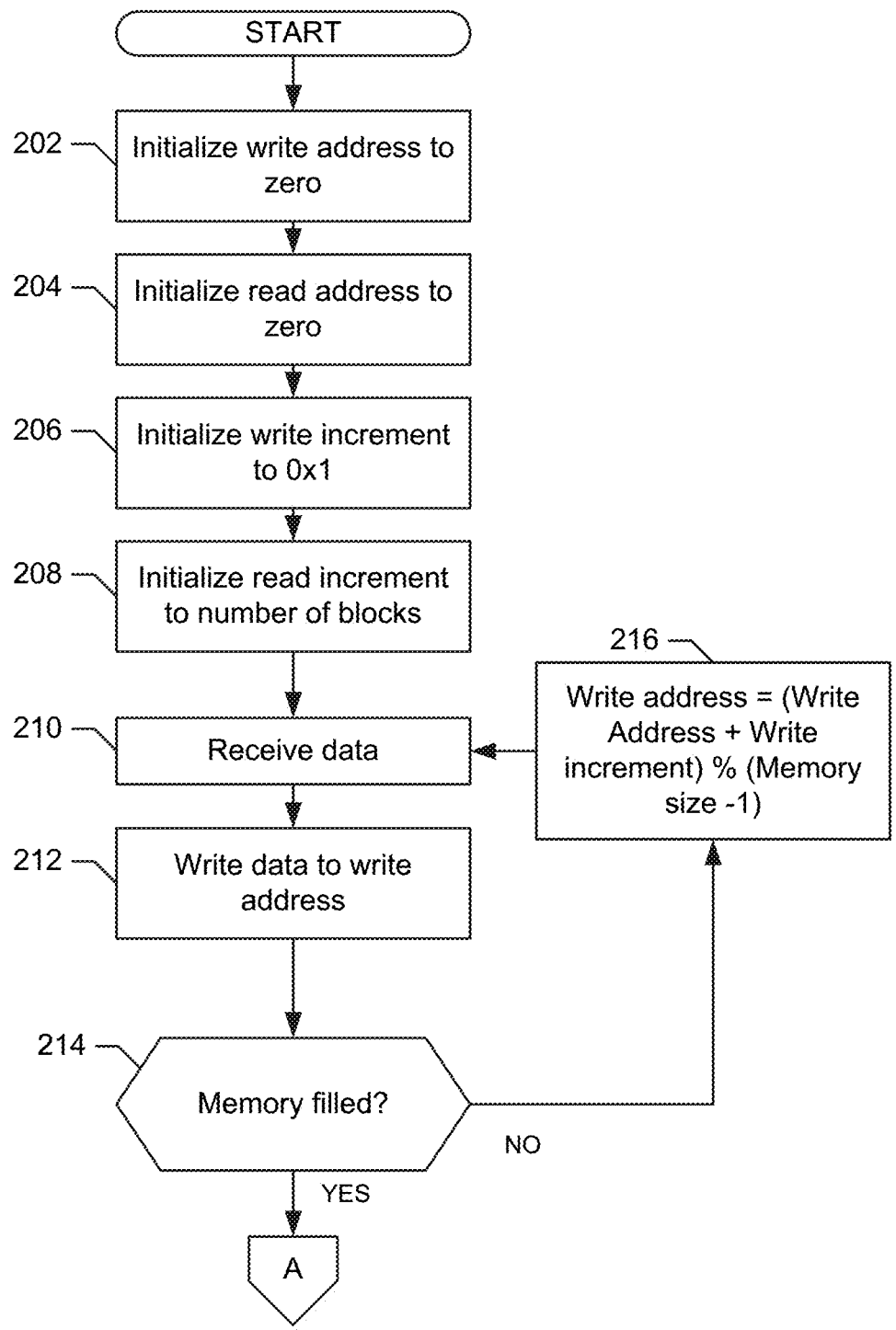
FIGS. 2-3 are flow diagrams of an example process that may be implemented as machine readable instructions that may be executed to implement the device of FIG. 1.
Figure 3:
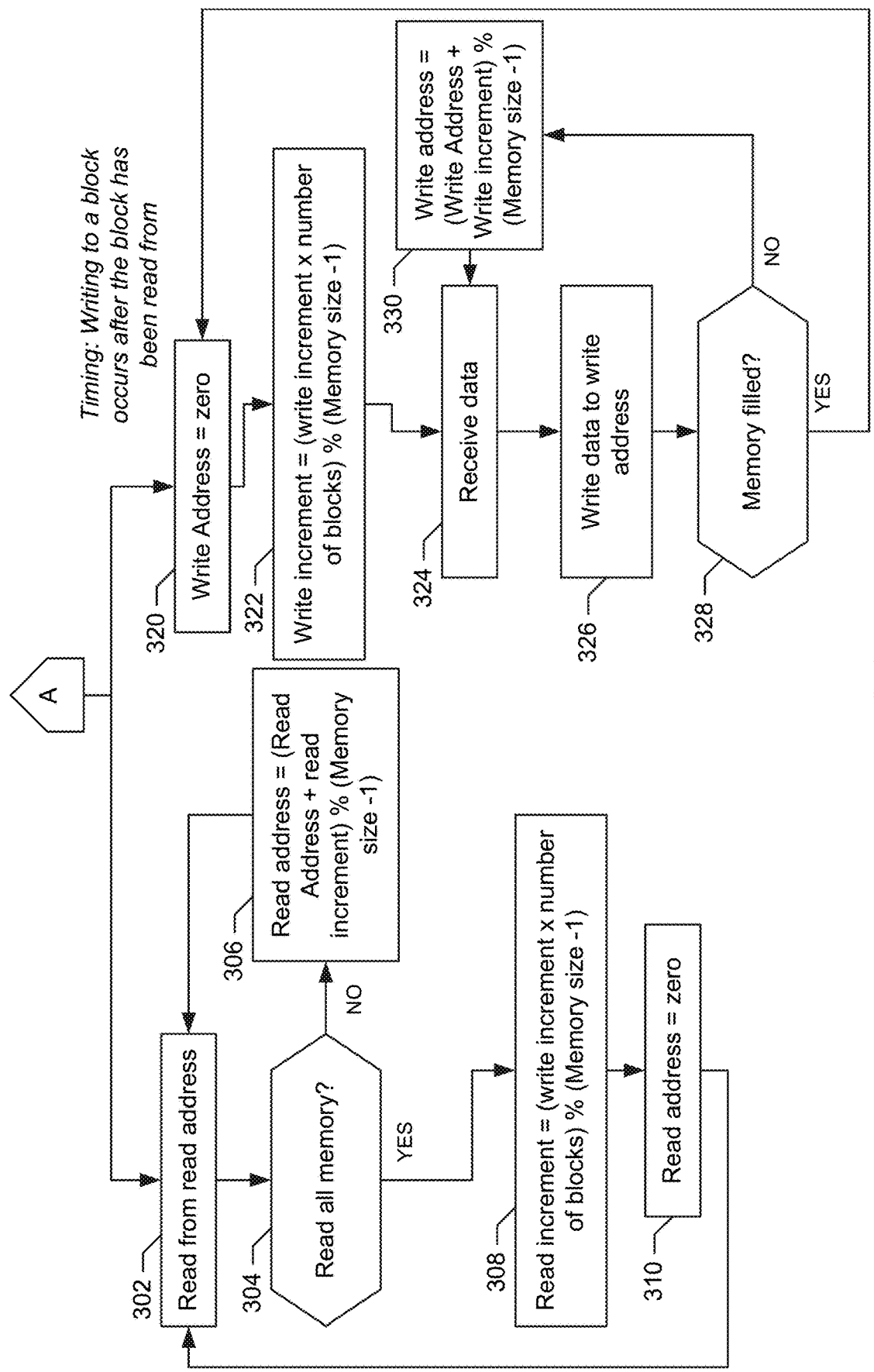

Flowcharts representative of example hardware logic, machine readable instructions, hardware implemented state machines, and/or any combination thereof for implementing the device 100 are shown in FIGS. 2-3. In this example, the machine readable instructions may be an executable program or portion of an executable program for execution by a computer processor such as the processor 912 shown in the example processor platform 900 discussed below in connection with FIG. 9. The program may be embodied in software stored on a non-transitory computer readable storage medium such as a CD-ROM, a floppy disk, a hard drive, a DVD, a Blu-ray disk, or a memory associated with the processor 912, but the entire program and/or parts thereof could alternatively be executed by a device other than the processor 912 and/or embodied in firmware or dedicated hardware. Further, although the example program is described with reference to the flowchart illustrated in FIGS. 3-4, many other methods of implementing the example device 100 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

As mentioned above, the example processes of FIGS. 2-3 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C.

The program of FIGS. 2-3 begins there is data to be handled (e.g., written into the memory 106 and read out for handling by the example data consumer 110). Alternatively, one or more operations may be performed when data is not ready to be written (e.g., upon initialization of the example device 100).

The example data writer 104 initializes a write address to zero (block 202). The example data reader 108 initializes a read address to zero (block 204). The example data writer 104 initializes a write increment to 0x1 (e.g., the address increment between consecutive blocks of the memory 106). The example data reader 108 initializes a read increment to be equal to the number of blocks of the memory (e.g., 0x10).

The example data receiver 102 receives data from the example data source 101 (block 210). The example data writer 104 writes the data to the current write address (block 212). The example data receiver 102 determines if the memory 106 has been filled (block 214). When the memory 106 has been filled, control proceeds to the operations illustrated by the flowchart of FIG. 3. When the memory 106 is not filled, the data writer 104 moves the write address to the next block (e.g., increments the write address by the write increment) (block 216). For example, to ensure that the data writer 104 does not overrun the memory 106, the data writer 104 may increment the write address using the formula (write address+write increment) % (memory size−1). Control then returns to block 210 to receive and write the new data.

Once the memory 106 has been filled, the example device moves to the next iteration in which the data reader 108 reads from the memory and, as it does so, the example data writer 104 writes to the memory locations from which data has already been read. According to the illustrated example, the read process (blocks 302-310) may be performed substantially in parallel with the write process (block 320-330). For example, each time a block is read from the memory 106, new data may be written to the memory location from which the block was read.

To read the data from the memory 106, the example data reader 108 reads from the current read address (starting at 0x0 on the first pass) (e.g., the data reader 108 may read the data from the read address and may transmit the data to data consumer 110 (block 302). The example data reader 108 determines if all data has been read (block 304). For example, the data reader 108 may determine when the read address exceeds the memory size, may determine when all block locations of the example memory 106 has been read. When all blocks have not been read, the data reader 108 increments the read address to the next read address location based on the read increment (block 306). For example, to ensure that the memory 106 is not overrun, the read address may be increment by calculating (read address+read increment) % (memory size−1). Control then returns to block 302 to read the next memory location.

When all of the memory 106 has been read, the example data reader 108 updates the read increment to utilize a read increment that will allow the data to be read out to the data consumer 110 in the desired block format despite the fact that the order of the blocks may no longer be stored in consecutive linear form (block 308). For example, the new read increment may be set to (write increment×number of blocks) % memory size−1. The example data reader 108 sets the read address to 0x0 (block 310).

According to the illustrated example, because the read increment is initialized to the block size, during the first iteration, the example data reader 108 reads the data from the memory 106 in block order even though the data has been written to the memory 106 in linear order.

While the example data reader 108 is reading from the memory 106, the data writer 104 can continue writing to the memory 106 utilizing the memory locations that have already been read out.

The example data writer 104 sets the write address back to 0x0. The example, data writer 104 sets the write increment based on the on the current write increment (block 322). While the data writer 104 is writing to the memory 106 while the data reader 108 is reading from the memory (e.g., but has not finished), the example data writer 104 sets the write increment to match the increment that the data reader 108 is utilizing to ensure that the data is written to the memory locations from which the data has already been read by the example data reader 108. For example, according to the illustrated example, the write increment is set using substantially the same calculation as the determination of the current read increment. For example, the write increment may be set to (write increment×number of blocks) % (memory size−1).

The example data receiver 102 receives data (block 324). The example data writer 104 writes the received data to the memory location at the write address (block 326). The example data writer 104 determines if the memory has been filled (e.g., a full iteration of reading the memory and back filling the memory with the next iteration of data) (block 328). When the memory has been filled, control returns to block 320 to start the next iteration.

When the memory has not been filled (block 328), the data writer 104 increments the write address to the next address to be written (block 330). For example, the data writer 104 may set the write address to (write address+write increment) % (memory size−1) to ensure that the write address does not overrun the memory 106.

Accordingly, the example process of FIGS. 2-3 enables the data to be written into memory 106 in a first order and read from the memory 106 in a second order. For example, the data may be written into the memory in linear order and ready from the memory in block order. Alternatively, the data may be written into memory in block order and read from the memory in linear order.

Figure 4:
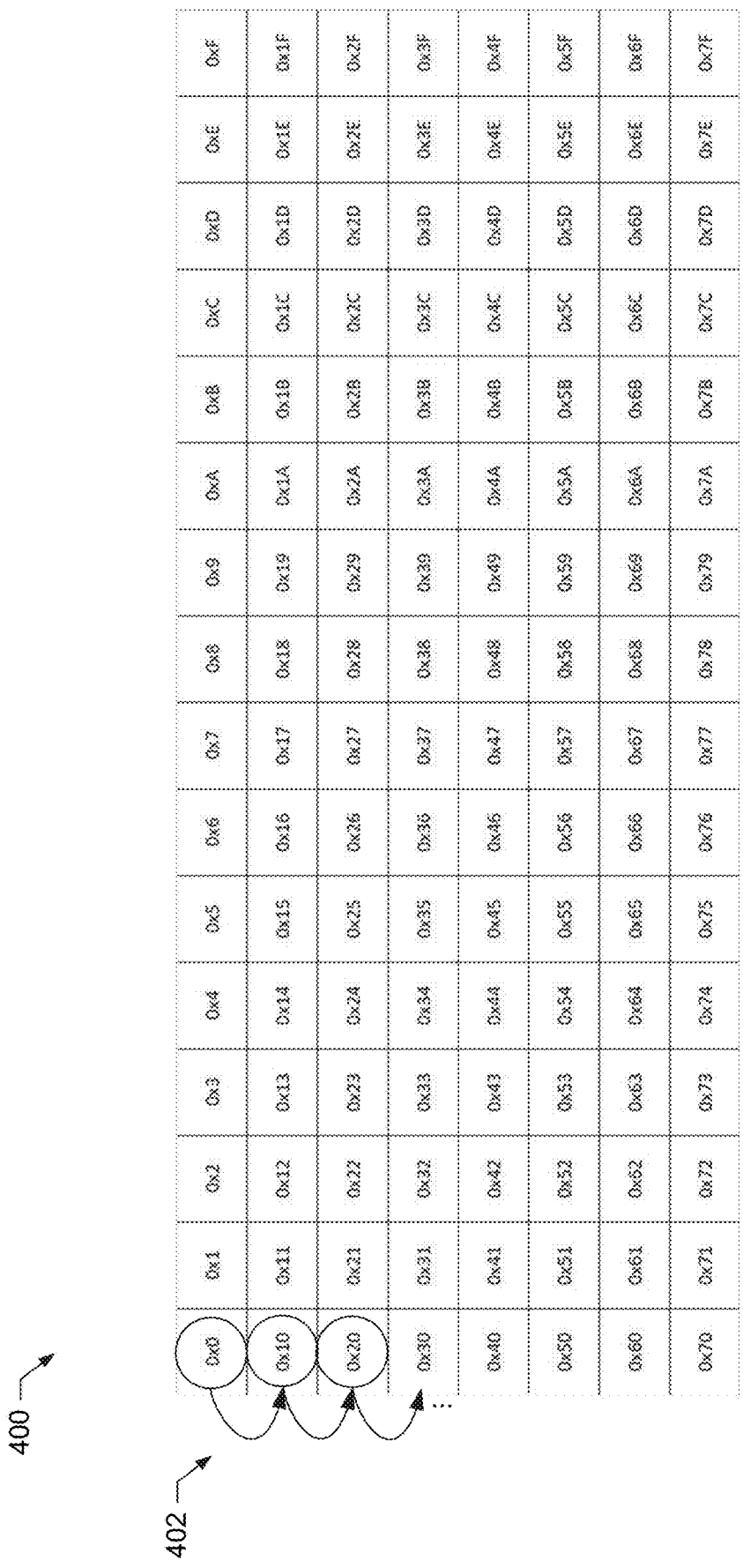
FIG. 4 illustrates the example state in which data has been written to the memory in linear order by the data writer of FIG. 1.
Figure 5:
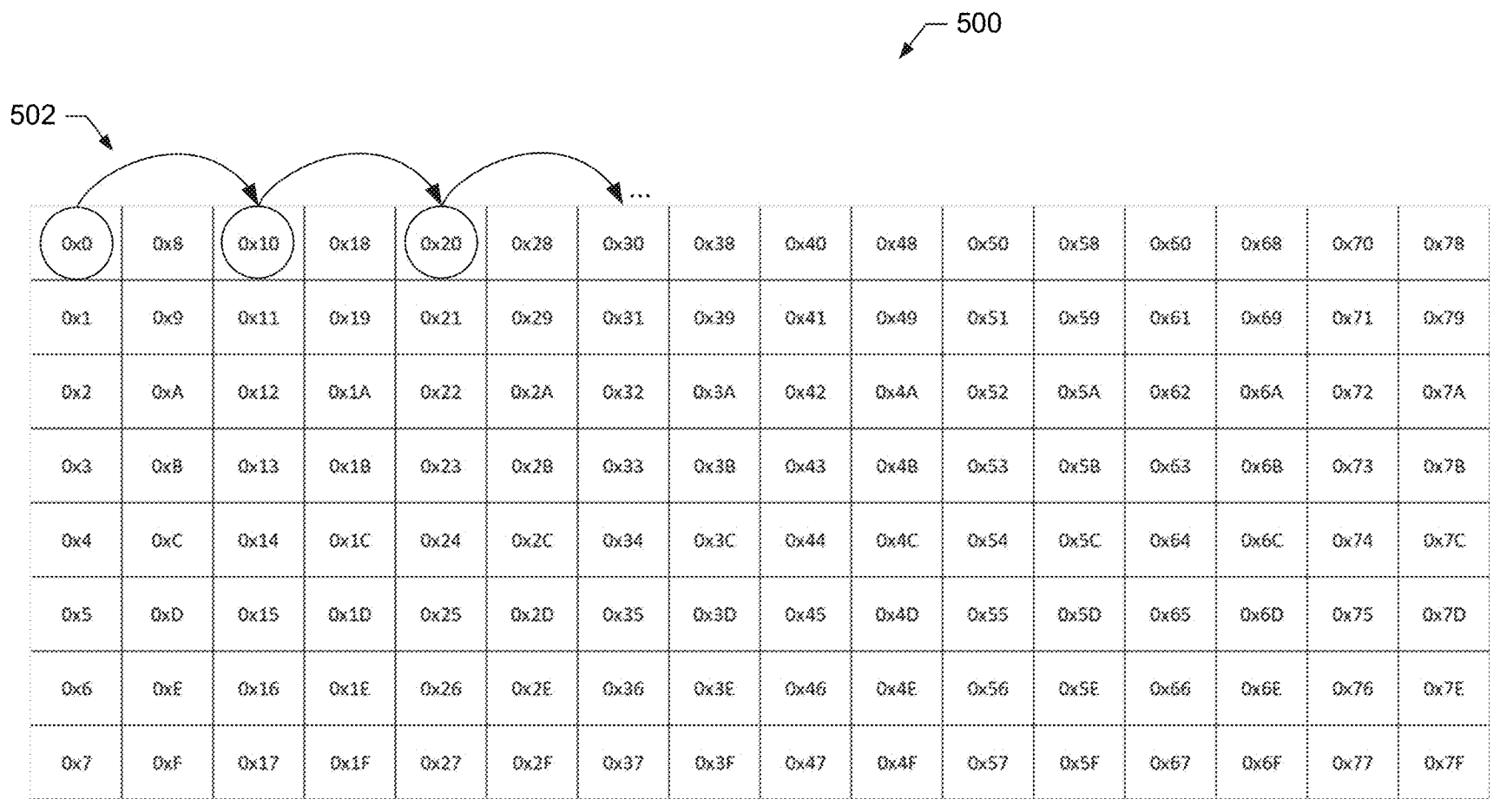

FIGS. 4-5 illustrate example states 400, 500 of the example memory 106.

FIG. 4 illustrates the example state 400 in which data has been written to the memory in linear order (e.g., into address 0x0, address 0x1, address 0x2, etc.) by the data writer 104. As illustrated in FIG. 4, the data reader 108 reads the data in block order 402. For example, the data is read down the first column, down the second column, etc. Accordingly, the use of the modulus operation in the read address incrementing (block 306) ensures that the read address wraps from the last element of the first column (0x70) to the first element of the second column (0x1).

FIG. 5 illustrates the example state 500 in which data has been written into the memory as the data is read in accordance with read order 402 of FIG. 4. Accordingly, the data is now written in the order proceeding down the columns. Thus, to read the data in block order, the data is read according to order 502 starting at 0x0 and incrementing by 0x2.

FIGS. 2-5 illustrate an example in which the width of a block can be read at one time. For example, for an 8×8 block size, a read port may be able to read 8 samples at one time. In such an implementation, the block is accounted for in 8 rows and 1 column is illustrated in FIG. 4 in which the block order 402 reads a block by reading the 8 rows of column 1.

Other block and memory sizes may be utilized.

In another example, for a block that is N×M, a memory (e.g., a native buffer) of size (N×L) elements may be utilized during the transformation, where L is the line length that is a multiple of M. For example, the memory may be sized as N×L elements (e.g., or L/M when converting from block order to line order). For such an example, the write address may be calculated as illustrated in FIG. 6 and the read address may be calculated as illustrated in FIG. 7. As illustrated in the examples of FIGS. 6 and 7, the divisor for incrementing is the product of (the number of blocks times the number of rows of the block size times the number of columns of the block size) minus the number of columns of the block size. According to the illustrated examples of FIGS. 6-7, as data elements are ready from the memory, new data elements are written to those memory locations to allow the memory to be continually written to and read without the need for waiting for the entire read process to be completed. Such operation is supported by the use a matching process for calculating the write address and the read address except that the read address increment initially begins at the product of the number of blocks times the number of columns in the block size to initially read the data out of the memory in block order while the data is written in line order starting with an increment of the number of columns of the block size during the first write iteration.

While FIGS. 2-7 illustrate an example in which data is transformed from line order to block order, the methods and apparatus disclosed herein may be utilized to perform other transformations (e.g., to transform from block order to line order). For example, to switch from transforming "line order to block order" to transforming "block order to line order", the value that the increment is multiplied by changes from "number of blocks" to "N" and the initial read increment changes from "M×number of blocks" (e.g., number of blocks in FIG. 2) to "M×N". An example process for address calculation is illustrated in FIG. 8.

As illustrated in FIG. 8, during the first write iteration, the data is inserted into the memory in the order it is received (e.g., block order). Subsequently, the data is read out in line order by, during the first iteration, reading the data using the read address increment of the product of the number of columns of the block size times the number of rows of the block size.

Figure 9:
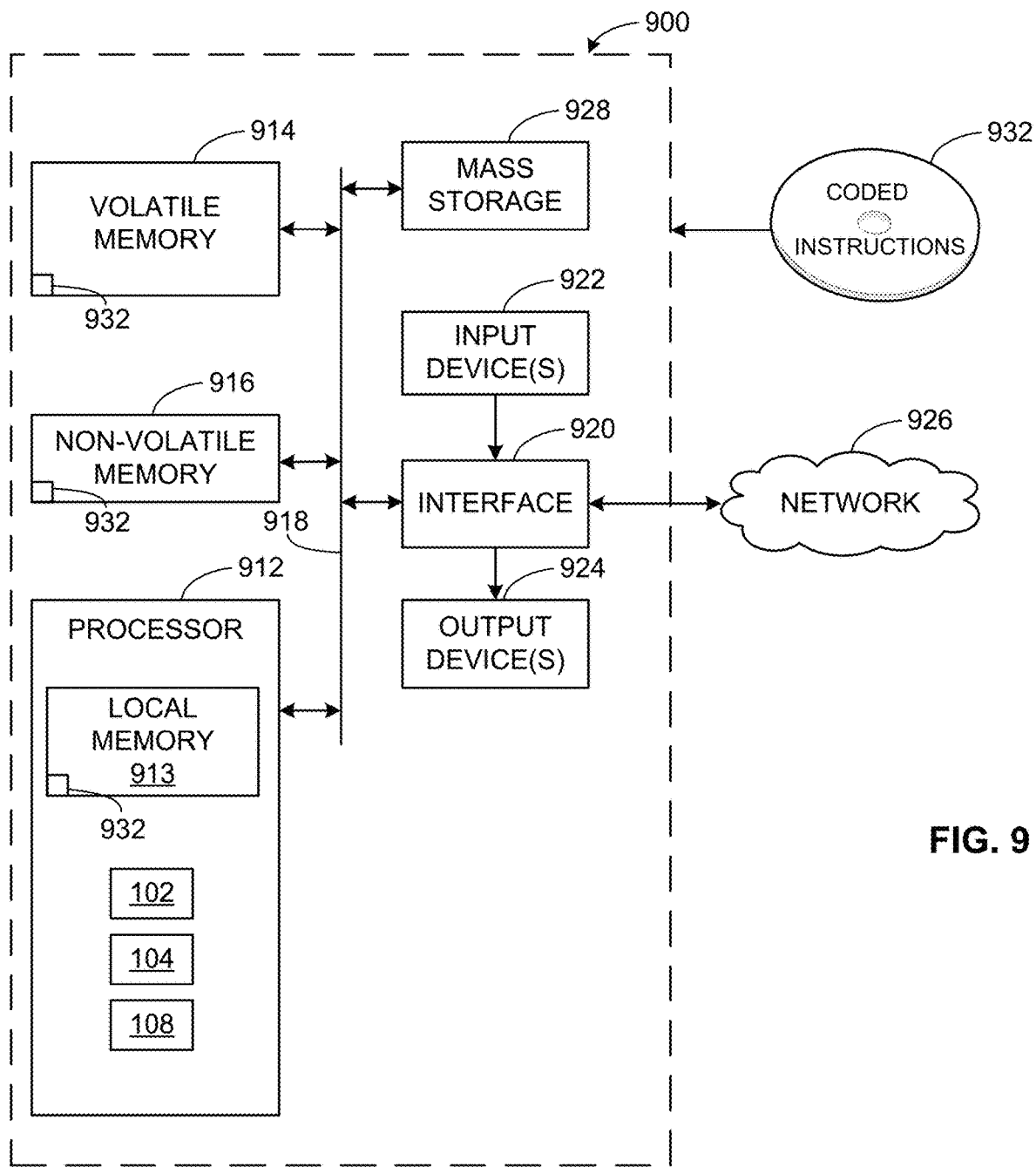
FIG. 9 is a block diagram of an example processor platform that may execute the instructions illustrated by FIGS. 2-3 to implement the device of FIG. 1.

FIG. 9 is a block diagram of an example processor platform 900 structured to execute the instructions of FIGS. 2-3 to implement the device 100 of FIG. 1. The processor platform 900 can be, for example, an embedded device, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset or other wearable device, or any other type of computing device.

The processor platform 900 of the illustrated example includes a processor 912. The processor 912 of the illustrated example is hardware. For example, the processor 912 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the data receiver 102, the data writer 104, and the data reader 108.

The processor 912 of the illustrated example includes a local memory 913 (e.g., a cache). The processor 912 of the illustrated example is in communication with a main memory including a volatile memory 914 and a non-volatile memory 916 via a bus 918. The volatile memory 914 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 916 may be implemented by flash memory and/or any other desired type of memory device. Access to the main memory 914, 916 is controlled by a memory controller. The example memory 106 may be implemented by the volatile memory 914 and/or any other memory.

The processor platform 900 of the illustrated example also includes an interface circuit 920. The interface circuit 920 may be implemented by any type of interface standard, such as an Ethernet interface, a universal serial bus (USB), a Bluetooth® interface, a near field communication (NFC) interface, and/or a PCI express interface.

In the illustrated example, one or more input devices 922 are connected to the interface circuit 920. The input device(s) 922 permit(s) a user to enter data and/or commands into the processor 912. The input device(s) can be implemented by, for example, an audio sensor, a microphone, a camera (still or video), a keyboard, a button, a mouse, a touchscreen, a track-pad, a trackball, isopoint and/or a voice recognition system. According to the illustrated example, the data source 101 is implemented by the input device 922.

One or more output devices 924 are also connected to the interface circuit 920 of the illustrated example. The output devices 924 can be implemented, for example, by display devices (e.g., a light emitting diode (LED), an organic light emitting diode (OLED), a liquid crystal display, a cathode ray tube display (CRT), an in-place switching (IPS) display, a touchscreen, etc.), a tactile output device, a printer and/or speaker. The interface circuit 920 of the illustrated example, thus, typically includes a graphics driver card, a graphics driver chip and/or a graphics driver processor. According to the illustrated example, the data consumer 110 is implemented by the output device 924.

The interface circuit 920 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 926. The communication can be via, for example, an Ethernet connection, a digital subscriber line (DSL) connection, a telephone line connection, a coaxial cable system, a satellite system, a line-of-site wireless system, a cellular telephone system, etc.

The processor platform 900 of the illustrated example also includes one or more mass storage devices 928 for storing software and/or data. Examples of such mass storage devices 928 include floppy disk drives, hard drive disks, compact disk drives, Blu-ray disk drives, redundant array of independent disks (RAID) systems, and digital versatile disk (DVD) drives.

The machine executable instructions 932 of FIGS. 2-3 may be stored in the mass storage device 928, in the volatile memory 914, in the non-volatile memory 916, and/or on a removable non-transitory computer readable storage medium such as a CD or DVD.

From the foregoing, it will be appreciated that example methods, apparatus and articles of manufacture have been disclosed that facilitate data transformation using, in some examples, a single intermediate buffer. In some examples, improvements are provided to computing devices by allowing data to be read and written in the order compatible with a particular operation (e.g., receiving linear data for writing to memory but processing data in block order), allowing for data to be written into the memory as the data is read out without the need to wait for the entire memory to be read, excluding multiple buffers, etc.

Example methods, apparatus, systems and articles of manufacture to detect anomalies in electronic data are disclosed herein. Further examples and combinations thereof include the following.

Example 1 is an apparatus comprising: a memory, a data writer to write received first data into the memory in a first order, and a data reader to read the first data from the memory in a second order, wherein the data writer is to write second data into the memory in the second order.

Example 2 includes the apparatus as defined in example 1, wherein the data writer is to write the second data into the memory after the data reader has begun reading the first data.

Example 3 includes the apparatus as defined in example 1, wherein the first order is linear order and the second order is block order.

Example 4 includes the apparatus as defined in example 1, wherein the data writer writes the second data in the second order by writing the second data in the first order at memory locations based on the second order.

Example 5 includes the apparatus as defined in example 1, wherein the data reader is to read the second data using a read increment determined based on a) a write increment used by the data writer to write the second data and b) a size of the memory.

Example 6 includes the apparatus as defined in example 1, wherein the data writer is to write the second data using a second write increment determined based on a) a first increment used in writing the first data and b) a size of the memory.

Example 7 is a method comprising: writing received first data into a memory in a first order, reading the first data from the memory in a second order, and writing second data into the memory in the second order.

Example 8 includes the method as defined in example 7, further comprising writing the second data into the memory after reading the first data has begun.

Example 9 includes the method as defined in example 7, wherein the first order is linear order and the second order is block order.

Example 10 includes the method as defined in example 7, further comprising writing the second data in the second order by writing the second data in the first order at memory locations based on the second order.

Example 11 includes the method as defined in example 7, further comprising reading the second data using a read increment determined based on a) a write increment used in writing the second data and b) a size of the memory.

Example 12 includes the method as defined in example 7, further comprising writing the second data using a second write increment determined based on a) a first increment used in writing the first data and b) a size of the memory.

Example 13 is a non-transitory computer readable storage medium comprising instructions that, when executed, cause a machine to at least: write received first data into a memory in a first order, read the first data from the memory in a second order, and write second data into the memory in the second order.

Example 14 includes the non-transitory computer readable storage medium as defined in example 13, wherein the instructions, when executed, cause the machine to write the second data into the memory after reading the first data has begun.

Example 15 includes the non-transitory computer readable storage medium as defined in example 13, wherein the first order is linear order and the second order is block order.

Example 16 includes the non-transitory computer readable storage medium as defined in example 13, wherein the instructions, when executed, cause the machine to write the second data in the second order by writing the second data in the first order at memory locations based on the second order.

Example 17 includes the non-transitory computer readable storage medium as defined in example 13, wherein the instructions, when executed, cause the machine to read the second data using a read increment determined based on a) a write increment used in writing the second data and b) a size of the memory.

Example 18 includes the non-transitory computer readable storage medium as defined in example 13, wherein the instructions, when executed, cause the machine to write the second data using a second write increment determined based on a) a first increment used in writing the first data and b) a size of the memory.

Example 19 is an apparatus that includes means for storing data, means for writing for writing received first data into the memory in a first order, and means for reading the first data from the memory in a second order, wherein the means for writing is to write second data into the memory in the second order.

Example 20 includes the apparatus as defined in example 19, wherein the means for writing is to write the second data into the memory after the data reader has begun reading the first data.

Example 21 includes the apparatus as defined in example 19, wherein the first order is linear order and the second order is block order.

Example 22 includes the apparatus as defined in example 19, wherein the means for writing is to write the second data in the second order by writing the second data in the first order at memory locations based on the second order.

Example 23 includes the apparatus as defined in example 19, wherein the means for reading is to read the second data using a read increment determined based on a) a write increment used by the means for writing to write the second data and b) a size of the memory.

Example 24 includes the apparatus as defined in example 19, wherein the means for writing is to write the second data using a second write increment determined based on a) a first increment used in writing the first data and b) a size of the memory.

Example 25 is a system comprising: an image capture device to capture image data; an image processing device to: write a first portion of the image data into a memory in a first order; read the first portion of the image data from the memory in a second order; transform the first portion of the image data read from the memory in the second order into transformed data using a discrete cosine transform; and write a second portion of the image data into the memory in the second order after the first portion of the image data is read from the memory in the second order.

Example 26 includes the system as defined in example 25, wherein the image processing device is to write the second portion of the image data into the memory after beginning to read the first portion of the image data.

Example 27 includes the system as defined in example 25, wherein the first order is linear order and the second order is block order.

Example 28 includes the system as defined in example 25, wherein the image processing device is to write the second portion of the image data in the second order by writing the second portion of the image data in the first order at memory locations based on the second order.

Example 29 includes the system as defined in example 25, wherein the image processing device is to read the second portion of the image data using a read increment determined based on a) a write increment used by the image processing device to write the second portion of the image data and b) a size of the memory.

Example 30 includes the system as defined in example 25, wherein the image processing device is to write the second portion of the image data using a second write increment determined based on a) a first increment used in writing the first portion of the image data and b) a size of the memory.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus comprising:
   a memory;
   a data writer to write received first data into the memory in a first order; and
   a data reader to read the first data from the memory in a second order,
   wherein the data writer is to write second data into the memory in the second order, and
   wherein the data reader is to read the second data using a read increment determined based on a) a write increment used by the data writer to write the second data and b) a size of the memory.

2. The apparatus as defined in claim 1, wherein the data writer is to write the second data into the memory after the data reader has begun reading the first data.

3. The apparatus as defined in claim 1, wherein the first order is linear order and the second order is block order.

4. The apparatus as defined in claim 1, wherein the data writer writes the second data in the second order by writing the second data at memory locations based on the second order.

5. The apparatus as defined in claim 1, wherein the data writer is to write the second data using the write increment determined based on a) an increment used in writing the first data and b) a size of the memory.

6. An apparatus comprising:
   a non-transitory computer readable medium to store instructions;
   a processor to execute the instructions stored in the non-transitory computer readable medium to at least:
   write received first data into a memory in a first order;
   read the first data from the memory in a second order;
   write second data into the memory in the second order; and
   read the second data using a read increment determined based on a) a write increment used in writing the second data and b) a size of the memory.

7. The apparatus as defined in claim 6, wherein the processor is to execute the instructions to write the second data into the memory after reading the first data has begun.

8. The apparatus as defined in claim 6, wherein the first order is linear order and the second order is block order.

9. The apparatus as defined in claim 6, wherein the processor is to execute the instructions to write the second data in the second order by writing the second data at memory locations based on the second order.

10. The apparatus as defined in claim 6, wherein the processor is to execute the instructions to:
    determine the write increment based on a) an increment used in writing the first data and b) a size of the memory.

11. A non-transitory computer readable storage medium comprising instructions that, when executed, cause a machine to at least:
    write received first data into a memory in a first order;
    read the first data from the memory in a second order;
    write second data into the memory in the second order; and
    read the second data using a read increment determined based on a) a write increment used in writing the second data and b) a size of the memory.

12. The non-transitory computer readable storage medium as defined in claim 11, wherein the instructions, when executed, cause the machine to write the second data into the memory after reading the first data has begun.

13. The non-transitory computer readable storage medium as defined in claim 11, wherein the first order is linear order and the second order is block order.

14. The non-transitory computer readable storage medium as defined in claim 11, wherein the instructions, when executed, cause the machine to write the second data in the second order by writing the second data at memory locations based on the second order.

15. The non-transitory computer readable storage medium as defined in claim 11, wherein the instructions, when executed, cause the machine to determine the write increment based on a) an increment used in writing the first data and b) a size of the memory.

16. An apparatus comprising:
means for storing data;
means for writing for writing received first data into a memory in a first order; and
means for reading the first data from the memory in a second order,
wherein the means for writing is to write second data into the memory in the second order, and
wherein the means for reading is to read the second data using a read increment determined based on a) a write increment used by the means for writing to write the second data and b) a size of the memory.

17. The apparatus as defined in claim 16, wherein the means for writing is to write the second data into the memory after the means for reading has begun reading the first data.

18. The apparatus as defined in claim 16, wherein the first order is linear order and the second order is block order.

19. The apparatus as defined in claim 16, wherein the means for writing is to write the second data in the second order by writing the second data at memory locations based on the second order.

20. The apparatus as defined in claim 16, wherein the write increment is determined based on a) an increment used in writing the first data and b) a size of the memory.

21. An apparatus comprising:
a memory;
a data writer to write received first data into the memory in a first order; and
a data reader to read the first data from the memory in a second order,
wherein the data writer is to write second data into the memory in the second order, and
wherein the data writer is to write the second data using a second write increment determined based on a) a first write increment used in writing the first data and b) a size of the memory.

22. The apparatus as defined in claim 21, wherein the data writer is to write the second data into the memory after the data reader has begun reading the first data.

23. The apparatus as defined in claim 21, wherein the first order is linear order and the second order is block order.

24. The apparatus as defined in claim 21, wherein the data writer writes the second data in the second order by writing the second data at memory locations based on the second order.

25. The apparatus as defined in claim 21, wherein the data reader is to read the second data using a read increment determined based on a) the second write increment used by the data writer to write the second data and b) a size of the memory.

26. An apparatus comprising:
a non-transitory computer readable medium to store instructions;
a processor to execute the instructions stored in the non-transitory computer readable medium to at least:
write received first data into a memory in a first order;
read the first data from the memory in a second order;
write second data into the memory in the second order; and
write the second data using a second write increment determined based on a) a first write increment used in writing the first data and b) a size of the memory.

27. The apparatus as defined in claim 26, wherein the processor is to execute the instructions to write the second data into the memory after reading the first data has begun.

28. The apparatus as defined in claim 26, wherein the first order is linear order and the second order is block order.

29. The apparatus as defined in claim 26, wherein the processor is to execute the instructions to write the second data in the second order by writing the second data at memory locations based on the second order.

30. The apparatus as defined in claim 26, wherein the processor is to execute the instructions to read the second data using a read increment determined based on a) the second write increment used in writing the second data and b) a size of the memory.

31. A non-transitory computer readable storage medium comprising instructions that, when executed, cause a machine to at least:
write received first data into a memory in a first order;
read the first data from the memory in a second order;
write second data into the memory in the second order; and
write the second data using a second write increment determined based on a) a first write increment used in writing the first data and b) a size of the memory.

32. The non-transitory computer readable storage medium as defined in claim 31, wherein the instructions, when executed, cause the machine to write the second data into the memory after reading the first data has begun.

33. The non-transitory computer readable storage medium as defined in claim 31, wherein the first order is linear order and the second order is block order.

34. The non-transitory computer readable storage medium as defined in claim 31, wherein the instructions, when executed, cause the machine to write the second data in the second order by writing the second data at memory locations based on the second order.

35. The non-transitory computer readable storage medium as defined in claim 31, wherein the instructions, when executed, cause the machine to read the second data using a read increment determined based on a) the second write increment used in writing the second data and b) a size of the memory.

36. An apparatus comprising:
means for storing data;
means for writing for writing received first data into the memory in a first order; and
means for reading the first data from the memory in a second order,
wherein the means for writing is to write second data into the memory in the second order, and
wherein the means for writing is to write the second data using a second write increment determined based on a) a first write increment used in writing the first data and b) a size of the memory.

37. The apparatus as defined in claim 36, wherein the means for writing is to write the second data into the memory after the data reader has begun reading the first data.

38. The apparatus as defined in claim 36, wherein the first order is linear order and the second order is block order.

39. The apparatus as defined in claim 36, wherein the means for writing is to write the second data in the second order by writing the second data at memory locations based on the second order.

40. The apparatus as defined in claim 36, wherein the means for reading is to read the second data using a read increment determined based on a) the second write increment used by the means for writing to write the second data and b) a size of the memory.

\* \* \* \* \*